(12) United States Patent
Wu et al.

(10) Patent No.: US 8,432,639 B2
(45) Date of Patent: Apr. 30, 2013

(54) PMR WRITER WITH π SHAPED SHIELD

(75) Inventors: Yan Wu, Cupertino, CA (US); Kenichi Takano, Santa Clara, CA (US); Moris Dovek, San Jose, CA (US)

(73) Assignee: Headway Technologies, Inc., Milpitas, CA (US)

( * ) Notice: Subject to any disclaimer, the term of this patent is extended or adjusted under 35 U.S.C. 154(b) by 275 days.

(21) Appl. No.: 12/800,039

(22) Filed: May 6, 2010

(65) Prior Publication Data
US 2011/0273798 A1  Nov. 10, 2011

(51) Int. Cl.
*G11B 5/10* (2006.01)
*G11B 5/31* (2006.01)

(52) U.S. Cl.
USPC ...................................... 360/125.3

(58) Field of Classification Search ............. 360/125.3
See application file for complete search history.

(56) References Cited

U.S. PATENT DOCUMENTS

| 7,035,062 | B1 | 4/2006 | Mao et al. | |
| 2005/0083605 | A1* | 4/2005 | Hu et al. | 360/125.3 |
| 2009/0002885 | A1 | 1/2009 | Sin | |

* cited by examiner

*Primary Examiner* — Craig A. Renner
(74) *Attorney, Agent, or Firm* — Saile Ackerman LLC; Stephen B. Ackerman

(57) ABSTRACT

A perpendicular magnetic recording (PMR) head is fabricated with a pole tip shielded laterally by a pair of symmetrically separated side shields that extend from an edge of a trailing edge shield to form a shield with the shape of a π. The easy axis direction of the side shields is in the in-track direction. As a result, the side shields effectively shield the fringing fields of the magnetic pole tip from causing adjacent track erasures, while not adding their own fringing fields that could cause erasures even beyond adjacent tracks.

5 Claims, 3 Drawing Sheets

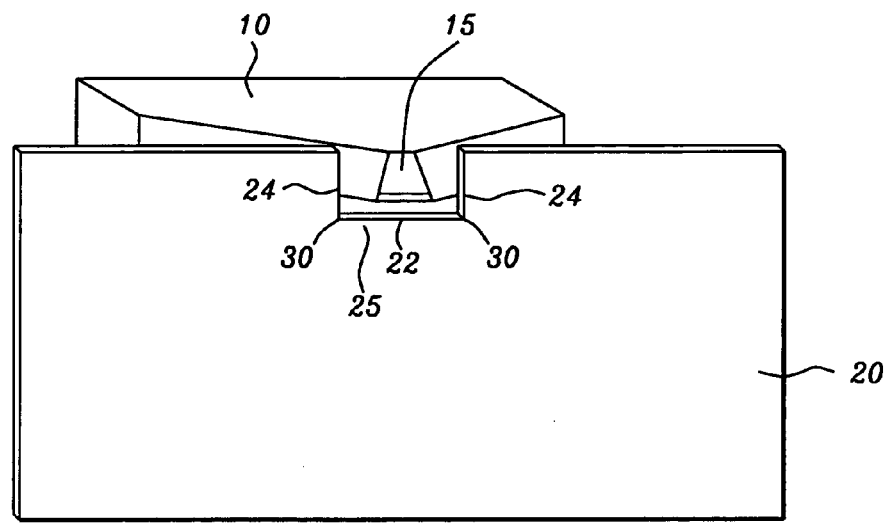
*FIG. 1 - Prior Art*
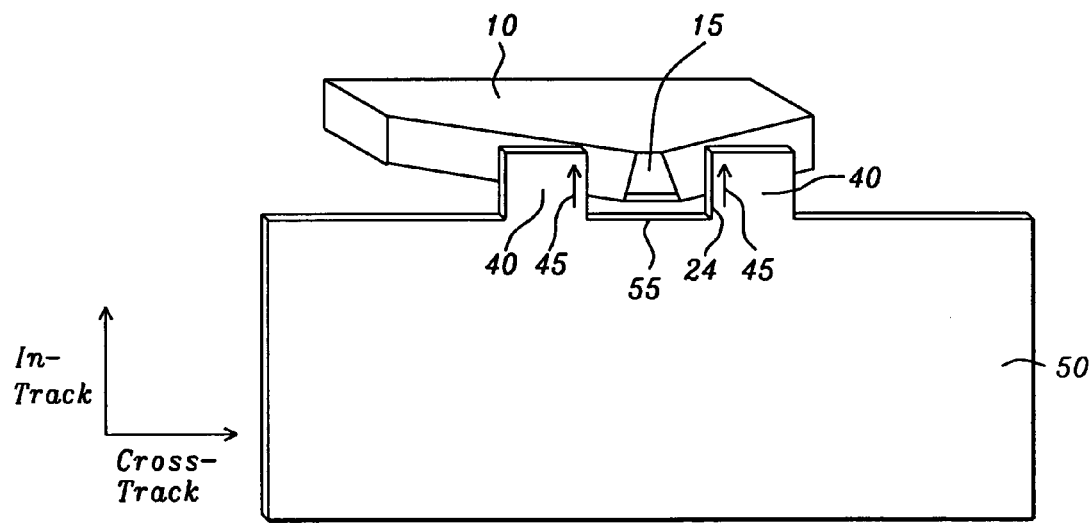
*FIG. 2*

# PMR WRITER WITH π SHAPED SHIELD

BACKGROUND OF THE INVENTION

1. Field of the Invention

This invention relates generally to magnetic recording heads, particularly to perpendicular recording heads that produce their recording magnetic fields perpendicularly to the recording medium. More specifically it relates to a shield formed about the recording pole in such a configuration that stray magnetic fields are not permitted to cause erasures of nearby recorded tracks.

2. Description of the Related Art

The increasing need for high recording area densities (up to 500 Gb/in$^2$) is making the perpendicular magnetic recording head (PMR head) a replacement of choice for the longitudinal magnetic recording head (LMR head).

By means of fringing magnetic fields that extend between two emerging pole pieces, longitudinal recording heads form small magnetic domains within the surface plane of the magnetic medium (hard disk). As recorded area densities increase, these domains must correspondingly decrease in size, eventually permitting destabilizing thermal effects to become stronger than the magnetic interactions that tend to stabilize the domain formations. This occurrence is the so-called superparamagnetic limit. Recording media that accept perpendicular magnetic recording, allow domain structures to be formed within a magnetic layer, perpendicular to the disk surface, while a soft magnetic underlayer (SUL) formed beneath the magnetic layer acts as a stabilizing influence on these perpendicular domain structures. Thus, a magnetic recording head that produces a field capable of forming domains perpendicular to a disk surface, when used in conjunction with such perpendicular recording media, is able to produce a stable recording with a much higher area density than is possible using standard longitudinal recording.

A significant problem with magnetic pole structures that are currently used to produce perpendicular fields, is that the fields tend to exhibit significant lateral fringing, thereby producing unwanted side-writing (writing in tracks adjacent to the intended track). This problem is much more evident in the perpendicular writing head than in the longitudinal writing head, even when the perpendicular head is shielded laterally (on its sides) to contain the fringing fields.

Even when PMR writers added side shields to the more usual trailing edge shields, it was found that the side shields contained sufficient amounts of magnetic flux to cause erasures along adjacent tracks. Referring to prior art FIG. 1, there is shown a perspective illustration of a magnetic pole of a PMR writer (10) surrounded on three sides by a magnetic shield (20). The air bearing surface of the main magnetic pole tip (15), shown here with a truncated triangular shape, emerges from a substantially rectangular opening (25) in the shield (20). This opening has a trailing edge (22) that is between the two corners (30), and two lateral edges (24), which define the inner edges of the side shields.

It is found that enough magnetic flux emerged from the edges (24) of the side shields to cause significant erasures on portions of the recording media laterally disposed to the position of the main magnetic pole. Depending on the distance between the pole tip and the edges (24) and corners (30) and the skew angle of the application (angle between the center line of the pole-tip ABS and the direction of motion along the recording track), the erasures actually went beyond adjacent tracks, causing what we refer to as skip track erasures.

If the shield corners (30) are reasonably close to the main pole, the erasure produced by the shield flux can be merged with the usual adjacent track erasures caused by the diverging flux of the pole tip itself. In either case, the reduction of the side erasures caused by the shield flux is necessary to create improved area density of recorded tracks (TPI, "tracks per inch").

Among the efforts in the prior art to address the adverse effects of field fringing is the side shielded head of Sin (US Patent Application Publication US2009/0002885) and the side shielded head of Mao et al. (U.S. Pat. No. 7,035,062). Neither of which provide the improved fringing control of the present invention.

SUMMARY OF THE INVENTION

A first object of this invention is to provide a method of forming a shielded pole structure for a perpendicular magnetic recording (PMR) head capable of recording at high area densities (up to 500 Gb/in$^2$).

A second object of the present invention is to provide a method of forming such a shielded pole structure for a perpendicular magnetic recording head in which side fringing of the magnetic field is significantly reduced, while the recording flux is strong and has a high degree of definition.

A third object of the present invention is to provide a method of forming such a shielded pole structure in which overwriting of adjacent tracks is eliminated or significantly reduced and in which individual tracks have a well defined profile.

A fourth object of the present invention is to provide a method of forming a perpendicular magnetic write head in which the magnetic pole is shielded at its trailing edge and from its sides.

A fifth object of the present invention is to provide a method of forming a perpendicular magnetic write head in which the effectiveness of the side shielding of pole tip flux is not reduced, while flux emerging from the shield itself is significantly reduced.

A seventh object of the present invention is to provide the shielded pole structure for the perpendicular magnetic recording head that is formed by the method.

The objects of the present invention are realized by the formation of a three-way shielded PMR pole structure to be used within a PMR head, where the side shields are shaped in the form of an inverted "pi," the Greek symbol π (hence, a "pi shaped side shield" or πSS) and wherein the easy magnetic axis (along with its magnetic flux) of the projecting pi shaped portions of the shield material is oriented along the track direction rather than the cross-track direction of the shield of FIG. 1.

BRIEF DESCRIPTION OF THE DRAWINGS

FIG. 1 is a schematic perspective representation showing the ABS of a main pole tip surrounded by a prior art type shield that shields its trailing edge and sides.

FIG. 2 is a schematic perspective representation of the it shaped side shields of the present invention.

FIG. 3a shows the effects when the write current ($I_w$) is 50 mA and FIG. 3b shows the effects when the write current is 100 mA.

DESCRIPTION OF THE PREFERRED EMBODIMENTS

Figure 3A:
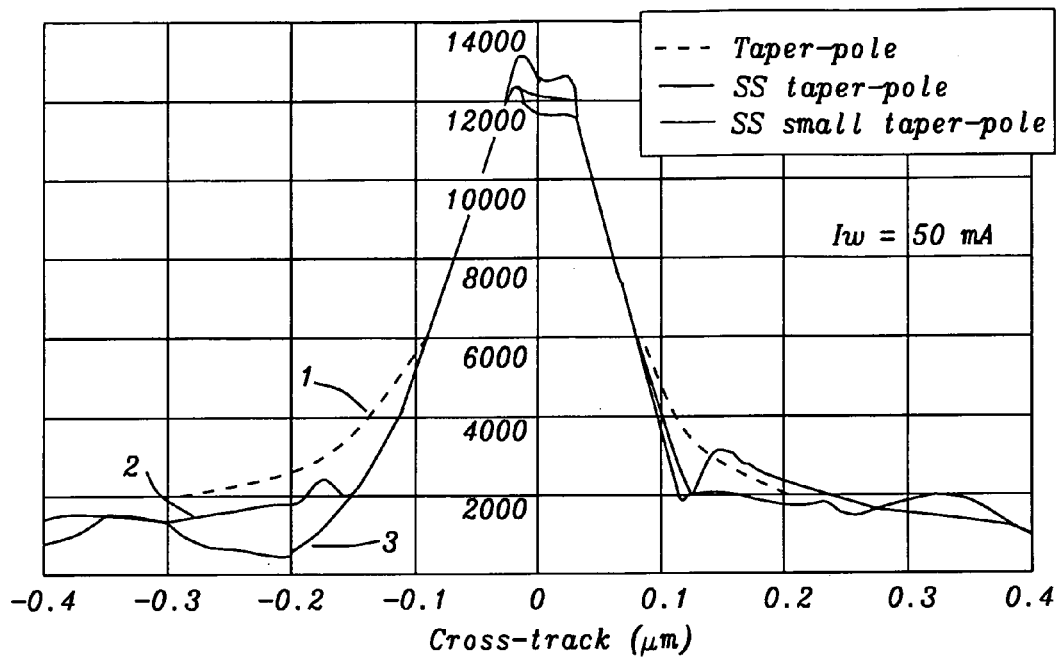
FIGS. 3a and 3b are schematic graphical representations showing the cross-track magnetic fields produced by an unshielded tapered pole, a traditionally shielded tapered pole such as that in FIG. 1 and the pole of the present invention, shielded as shown in FIG. 2.

The preferred embodiment of the present invention is a shielded pole structure for use within a perpendicular magnetic recording (PMR) head, in which the emerging ABS portion of the main pole tip is surrounded by two narrow projecting shields that form a side shield. Unlike prior art side shields as shown in prior art FIG. 1, where the side shield portion extends for the entire width of the shield, the finite width of these projecting portions, which give the entire shield an inverted π-shape, allow the easy axis (direction of magnetic anisotropy) of the portions (and the resulting magnetic flux) to be directed along the recorded tracks rather than in the cross-track direction.

Referring to FIG. 2, there is shown a schematic perspective illustration of the main pole tip (10) of a PMR writer surrounded by the shield (50) of the present invention. The shield is formed of magnetic material such as NiFe, CoFe or CoNiFe, and is typically of a thickness between approximately 0.1 microns and 1.0 microns. In the present embodiment, the width of each of the side shield portions (40) in the lateral direction is between approximately 0.1 and 1.0 microns and the lateral edge-to-edge separation of the side shield portions (edge (24) to edge (24)) is between approximately 0.1 and 0.4 microns. Generally an aspect ratio of these projections (height to width) of between 0.5 and 1 is preferable.

The side edges (24) of the projections (40) shield the tapered (in a direction away from the ABS) trailing edge of the ABS of the pole-tip (15) so that unwanted adjacent track erasures caused by emerging flux in the cross-track direction is eliminated.

The substantially rectangular projections (40) of the π-shaped shield project in the in-track direction (see axes) from the trailing edge (55) of the trailing edge portion of the shield (50) to form side shields whose purpose is to restrict the emerging flux from the pole tip in the cross-track direction so that it does not cause adjacent track erasures. In addition, according to the objects of the present invention, the shape of the side shields and the direction of their easy axis, shown as arrows (45) along the in-track direction, does not allow these side shields to produce their own flux that would create both adjacent and skipped track erasures. In the present embodiment, the width of the side shield portions in the lateral direction is between approximately 0.1 and 1.0 microns. Generally an aspect ratio of these projections (height to width) of between 0.5 and 1 is preferable.

Figure 3B:
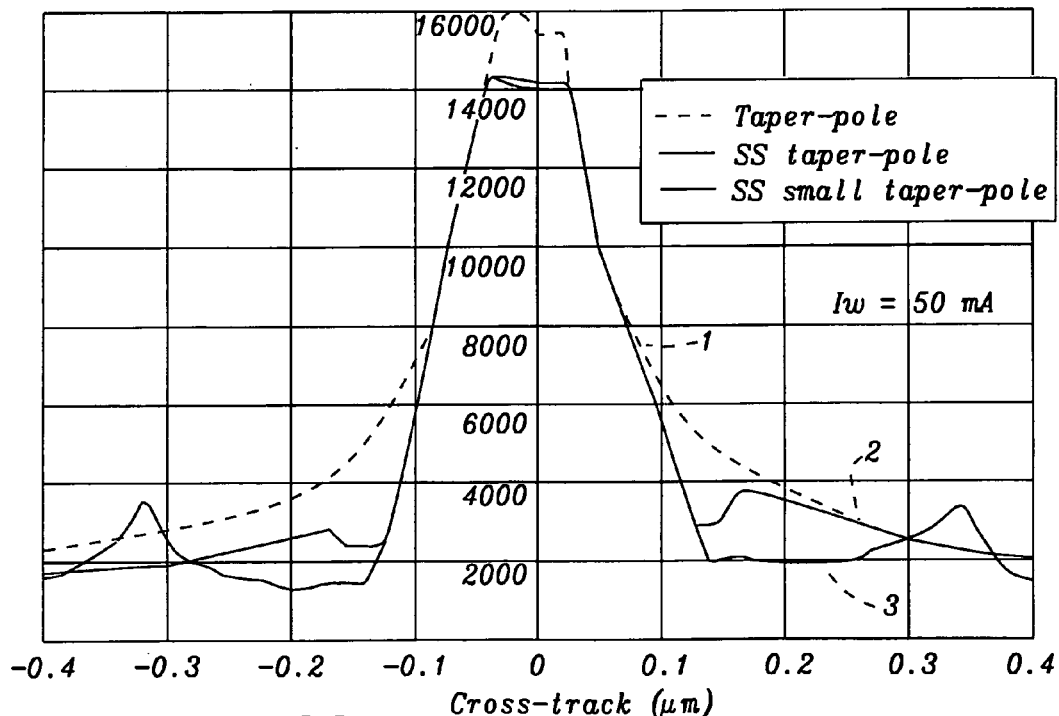

Referring now to FIGS. 3a and 3b, there is shown the effect on cross-track fields of the side shields of the present invention as compared to an unshielded pole tip and a pole tip shielded by a prior art shield of FIG. 1. The three graphs are indicated within the legend as "Taper-pole" (1), meaning an unshielded pole-tip of trapezoidal ABS shape whose trailing edge is tapered downward (i.e. the pole becomes thicker) away from the ABS as shown in FIG. 1 or FIG. 2; "SS taper-pole" (2), meaning the tapered pole of (1) surrounded by the prior art side shield (SS) of FIG. 1; and "SS small taper-pole," (3) indicating the π-shaped small side shield of the present invention as shown in FIG. 2.

FIGS. 3a and 3b differ only in the energizing current of the write head, $I_w$, the current being 50 mA in FIGS. 3a and 100 mA in FIG. 3b. Significantly, the cross-track fields of π-shaped small shield (3) in each graph show a significant reduction of the effective recording field, $H_{eff}$, in the region that is +/−0.1 microns away from the mid-line of the pole tip. On the other hand, the effective field shown in (2), indicates an increase in the field in the region that is +/−0.15 microns away from the pole tip. This increase is due to the flux generated by the side shields themselves, in the prior art shape. The unshielded pole (1) shows a smooth variation of flux in both cross-track directions that is larger than that of either side shield configuration.

Figure 4A:
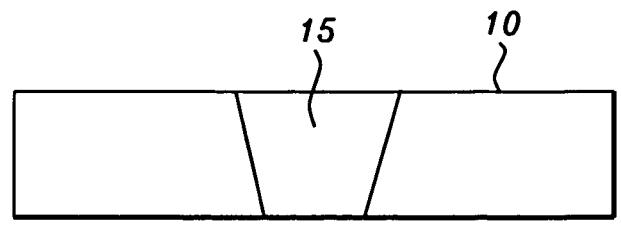
FIGS. 4a-4c are schematic illustrations showing the formation of the side shields of the present invention and of the trailing edge shield that connects them.

The side shields of the present invention can be fabricated using methods well known in the art to produce the prior-art shields, but now applied to produce the π-shaped small side shield of the present invention. Specifically, referring first to FIG. 4a, there is shown schematically in a frontal (ABS) view (trailing edge now on top), a main pole tip (10) formed by (for example) plating within a milled $Al_2O_3$ form. The ABS of the pole tip (15) and its taper (not indicated) may also be made by milling or by other shaping methodologies.

Figure 4B:
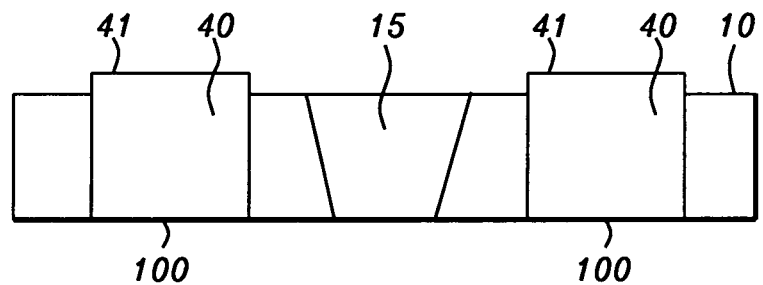

Referring next to FIG. 4b, there is shown schematically a shield plating process by which the two side shield projections (40) are formed on an appropriate substrate (100) to either side of the pole tip. Subsequent to the formation of the side shields (40), their trailing edge surfaces (41) will be planarized by a CMP (chemical mechanical polishing) process.

Figure 4C:
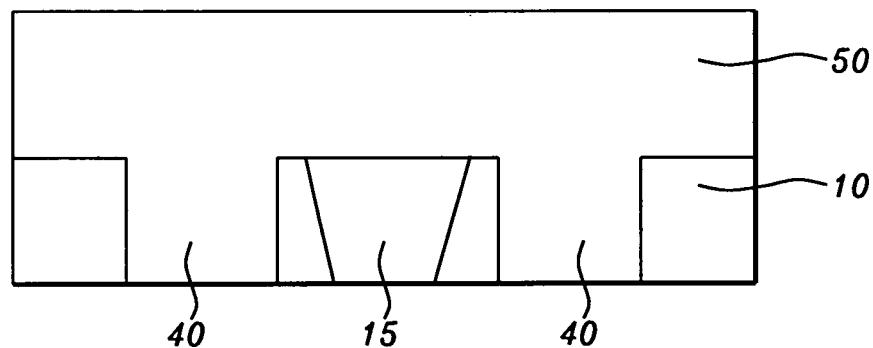

Referring finally to schematic FIG. 4c, there is shown a final plating step wherein the trailing edge shield (50) is plated over the now smoothly polished edges of the side shields to physically and mechanically connect them.

As is understood by a person skilled in the art, the preferred embodiment of the present invention is illustrative of the present invention rather than limiting of the present invention. Revisions and modifications may be made to methods, materials, structures and dimensions employed in forming and providing a PMR head having a main pole-tip surrounded by a π-shaped magnetic shield configuration with its easy axis direction along a recording track, while still forming and providing such a PMR head and pole and its method of formation in accord with the spirit and scope of the present invention as defined by the appended claims.

What is claimed is:

1. A PMR head comprising:
   a pole tip;
   a monolithic magnetic shield surrounding said pole tip in an ABS plane of said pole tip, wherein said shield forms a trailing edge shield portion having an edge in a cross-track direction and includes two side shield portions projecting from said edge in a direction transverse to said cross-track direction, which is a down-track direction; wherein
   the two side shield portions of said magnetic shield are formed as two substantially rectangular projections extending in an in-track direction from said edge of said trailing edge shield portion and wherein said projections are laterally disposed symmetrically about said pole tip and separated from each other thereby and, wherein, together with said edge of said trailing edge shield portion, said projections form the shape of a π; wherein
   said rectangular projections have an aspect ratio of length to width of between approximately 0.5 and 1.0, wherein
   an easy axis direction of said side shield portions along edges adjacent to said pole tip is in said down-track direction and whereby flux emerging from said side shield portions is also in said down-track direction and, therefore, does not extend laterally to cause unwanted adjacent track erasures.

2. The PMR head of claim 1 wherein said monolithic magnetic shield is formed of magnetic materials NiFe, CoFe or CoNiFe, to a uniform thickness between approximately 0.1 and 1.0 microns.

3. The PMR head of claim 2 wherein said substantially rectangular projections forming said side shields portions have a width in a cross-track direction of between approximately 0.1 and 1.0 microns and are separated from each other by a distance of between approximately 0.1 and 0.4 microns.

4. The PMR head of claim 1 wherein said shield eliminates fringing fields of said pole tip that would cause adjacent track erasures, while not generating its own field that would cause additional erasures even beyond said adjacent tracks erasures.

5. The PMR head of claim 1 wherein said pole tip has a trapezoidal cross-sectional shape, wherein said trapezoidal shape has a trailing edge and a leading edge that are parallel and wherein said trailing edge is wider than said leading edge and wherein said pole tip tapers in a direction away from said ABS plane so that a width from leading to trailing edge is narrowest at said ABS plane.

\* \* \* \* \*